Patented May 18, 1926.

1,585,063

UNITED STATES PATENT OFFICE.

WILLIAM WHYTE, OF EDINBURGH, SCOTLAND.

PAINT.

No Drawing.   Application filed August 27, 1924.   Serial No. 734,524.

This invention has for its object to produce an improved separating paint having the inherent quality of separating or producing natural irregular designs in relief on the wall or other surface to which it is applied without requiring the previous application to the surface of an undercoat of special composition.

According to my invention the separating paint consists of the following ingredients in the following approximate proportions:— 80 to 100 lbs. of Paris white (sifted and dry), 4 to 6 lbs. of stucco, 7 to 9 lbs. lithopone, 6 to 8 lbs. hard and soft strong gums in suitable proportions such as 4½ lbs. of gum arabic to 1½ lbs. gum tragacanth, each dissolved in just sufficient water, 1½ lbs. of cream of tartar and 12½ lbs. of water are mixed and finely ground in a roller mill or the like. In a separate vessel I mix 5½ lbs. of finely ground zinc oxide with 5½ lbs. linseed oil (fire-boiled), also known as Dutch stand oil, 2½ lbs. paraffin oil 2½ lbs. of pale boiled linseed oil with a suitable drier. I then incorporate the whole together by thorough mixing and the material is then ready for use.

The improved separating paint can be applied to any dry surface which has been previously rendered non-absorbent, such as by means of one or two coats of ordinary oil paint, and can be applied over a dry oil-painted surface of any colour, without the previous application of an undercoat of special composition. The separation of my improved paint on the surface to which it is applied, reveals the ground colour as part of the finish, thus giving a two-colour effect when applied to a plain painted surface.

If higher relief is desired, two coats of my improved separating paint may be applied to the surface, using an intermediate coat of oil paint.

The decorative effects in low colour relief obtained by my improved separating paint can be glazed, scumbled or wiped. Various irregular designs in relief, such as loops, globules and other markings, can be obtained by regulating the addition of water to my improved separating paint according to the result desired. Should regularity of the surface design be desired, the surface may be stippled slightly.

The improved separating paint can be applied to the surface by means of a brush and the decorative surface so produced may be scumbled with metallic effects by the use of gold or other bronzes in any suitable medium.

The improved separating paint can be tinted with oil colour or other colouring substances or it may be glazed over with suitable colours, scumbled and wiped in the usual manner according to the colour scheme in use.

Claims.

1. An improved separating paint consisting of Paris white, stucco, lithopone, gums, cream of tartar and water incorporated with zinc oxide, Dutch stand oil, paraffin oil, boiled linseed oil and a drying agent.

2. An improved separating paint consisting of the following ingredients in the following approximate proportions, namely:— 80–100 lbs. Paris white, 4–6 lbs. stucco, 7–9 lbs. lithopone, 6–8 lbs. gums, 1½ lbs. cream of tartar and 12½ lbs. water incorporated with 5½ lbs. zinc oxide, 5½ lbs. Dutch stand oil, 2½ lbs. paraffin oil, 2½ lbs. boiled linseed oil and a drying agent.

3. A separating paint as claimed in claim 1 tinted with a colouring substance.

4. A separating paint as claimed in claim 1 tinted with an oil colour.

The foregoing specification signed at Edinburgh, Scotland, this 2" day of August, 1924.

WILLIAM WHYTE.